United States Patent
Annas

[15] 3,665,392
[45] May 23, 1972

[54] VEHICLE DRIVER-ACTUATED SAFETY SIGNAL LIGHT ASSEMBLY

[72] Inventor: John T. Annas, 2644 Indian Mount South, Birmingham, Mich. 48011

[22] Filed: Aug. 24, 1970

[21] Appl. No.: 66,276

Related U.S. Application Data

[63] Continuation-in-part of Ser. No. 817,543, Apr. 18, 1969, abandoned.

[52] U.S. Cl..................................340/67, 340/85, 340/97, 340/380, 340/382, 340/383
[51] Int. Cl..........................................................B60q 1/44
[58] Field of Search......................340/55, 67, 79, 80, 84, 85, 340/87, 97, 98, 366, 380, 382, 383

[56] References Cited

UNITED STATES PATENTS

| | | | |
|---|---|---|---|
| 2,458,323 | 1/1949 | Volker | 340/55 X |
| 2,190,123 | 2/1940 | Pace | 340/97 |
| 1,806,276 | 5/1931 | Bailey | 340/97 |
| 2,693,589 | 11/1954 | Hopkins | 340/98 |
| 2,245,755 | 6/1941 | Carpenter | 340/383 UX |
| 3,364,384 | 1/1968 | Dankert | 340/66 X |
| 1,635,863 | 7/1927 | Schulz et al. | 340/383 UX |
| 1,519,980 | 12/1924 | Douglass | 340/382 UX |
| 1,553,959 | 9/1925 | Pirkey | 340/97 |

FOREIGN PATENTS OR APPLICATIONS

| | | | |
|---|---|---|---|
| 493,510 | 10/1938 | Great Britain | 340/52 |
| 743,679 | 1/1956 | Great Britain | 340/84 |

Primary Examiner—John W. Caldwell
Assistant Examiner—Kenneth N. Leimer
Attorney—Winnie and Romanski

[57] ABSTRACT

A driver communication signal mounted against the front windshield of a motor vehicle, visible to pedestrians and oncoming traffic and automatically energized upon brake application to indicate driver's intention to stop. The invention provides a double light source and driver-observed light source monitoring means as well as provision to ensure good visibility even on bright sunshine days.

7 Claims, 11 Drawing Figures

Patented May 23, 1972 3,665,392
2 Sheets-Sheet 1
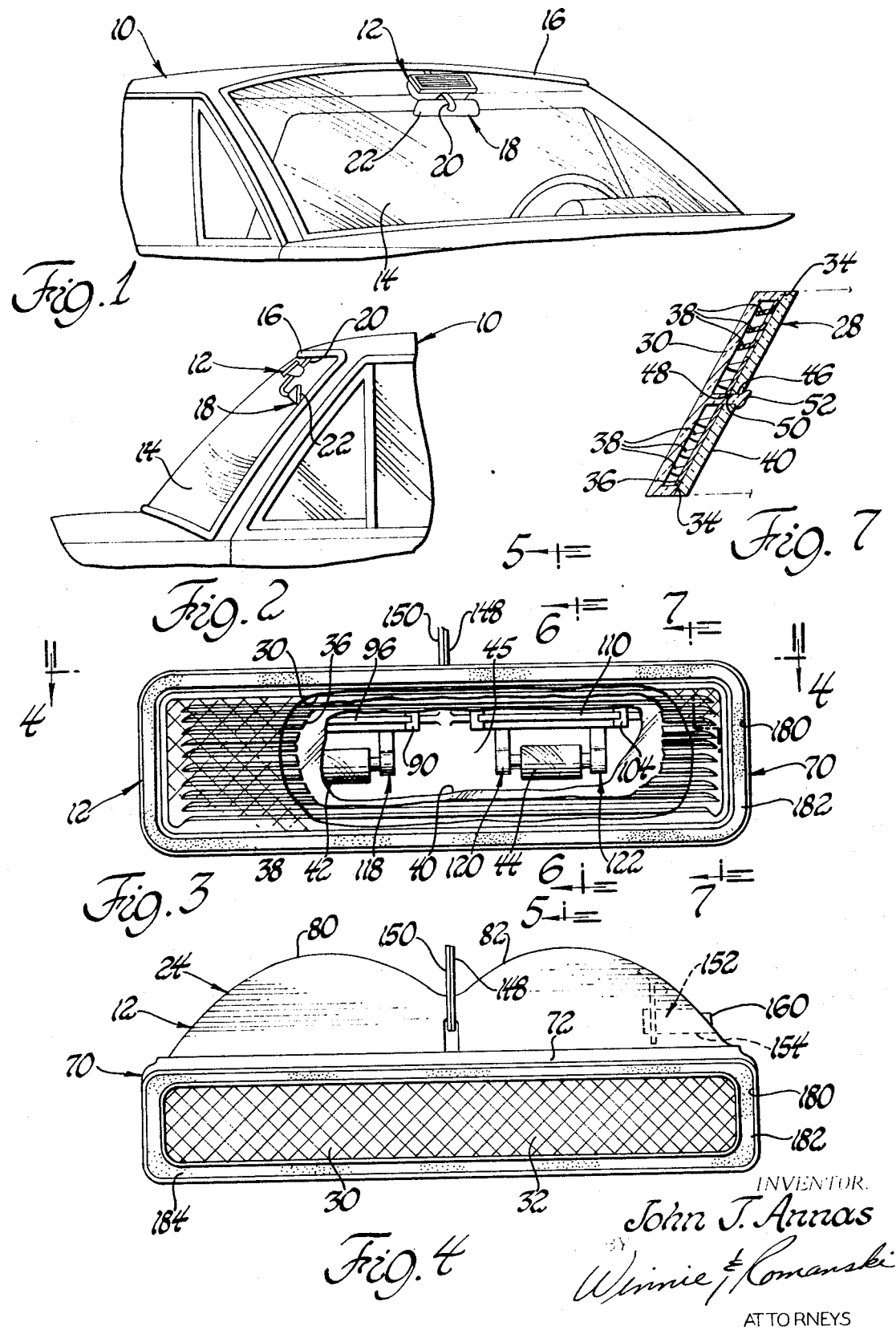

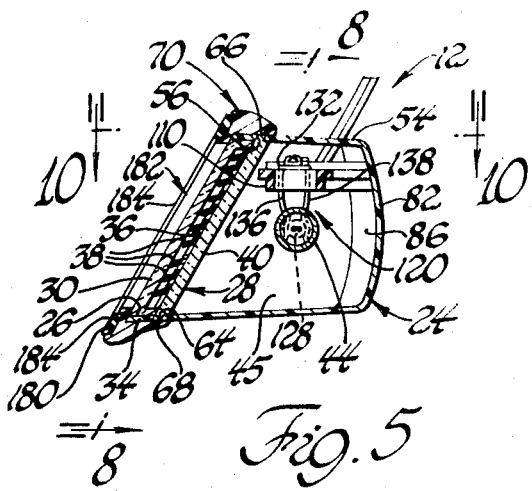
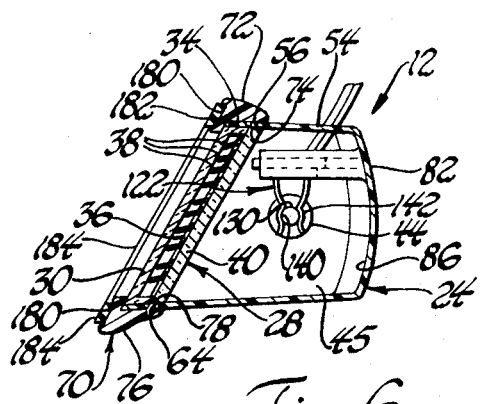
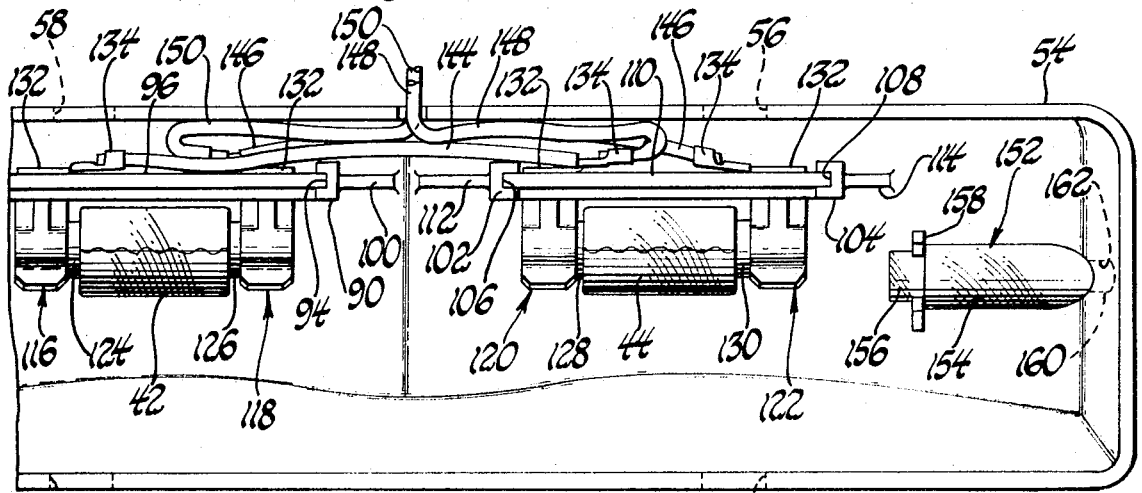
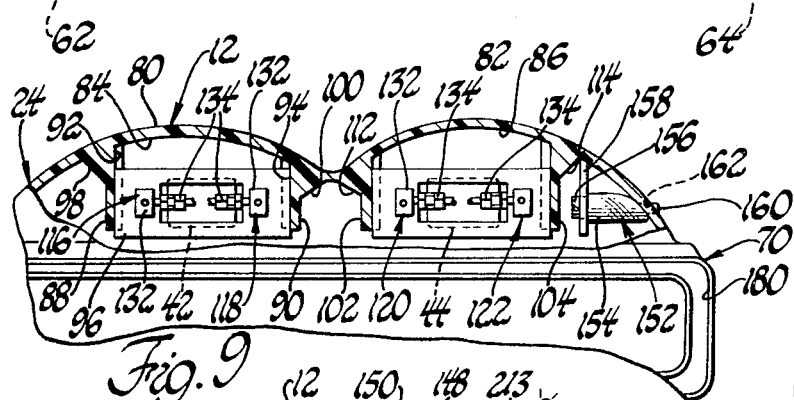
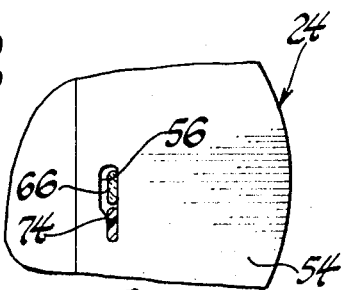
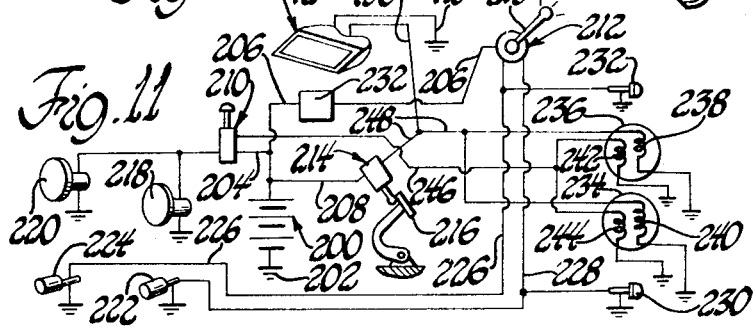

VEHICLE DRIVER-ACTUATED SAFETY SIGNAL LIGHT ASSEMBLY

RELATED APPLICATION

The Application is a Continuation - in - Part of my copending application, Ser. No. 817,543 filed in the U. S. Pat. Office on Apr. 18, 1969, now abandoned.

BACKGROUND OF THE INVENTION

This invention relates to signal lights for vehicles and more particularly to a driver communication signal for use on the front windshield of automotive vehicles to communicate the intentions of a driver to oncoming traffic, pedestrians and others.

Presently vehicles are provided with forwardly and rearwardly located signal lamps which are selectively actuated in a flasher sequence in order to indicate to the traffic and pedestrians, forwardly and rearwardly of the vehicle, the vehicle operator's intention to make a turn in the direction of the flashing signal lamps.

Vehicles are also provided with rearwardly mounted and rearwardly directed lamps which are energized, whenever the vehicular transmission has been shifted into the reverse drive mode, to indicate to the traffic and pedestrians rearwardly of the vehicle that the vehicle was about to travel in reverse and, at the same time, if occurring at night time, illuminating the path of travel for the vehicle operator.

In addition to the above, vehicles are also provided with rearwardly mounted lamp assemblies which are energized in response to actuation of the vehicular brake system in order to warn traffic rearwardly of the vehicle that the vehicle is in the process of either slowing or stopping.

However, the above safety signals and devices fail to provide for communication between the operator and other operators of other vehicles as well as between the operator and pedestrians in, for example, the following situations.

Pedestrians crossing a marked intersection when the traffic light changes are not sure that the vehicles which were stopped will remain stopped to permit a safe completion of their crossing.

The operator of a vehicle progressing on the entrance ramp of a freeway is not sure that other vehicles moving in the same direction but already on the freeway will slow to permit safe merging of the vehicles.

In a situation involving an unmarked intersection with two vehicles approaching the intersection on a collision course, neither vehicle knows whether or not the other vehicle is in the act of preparing to stop.

In situations involving panic stopping, the operator of the vehicle undergoing such a panic stop cannot tell whether the vehicle behind is aware of the situation.

Accordingly, the invention as herein disclosed and described is concerned with the solution of the above and other related problems.

SUMMARY OF THE INVENTION

This invention is most particularly directed to a driver communication signal which is located against the windshield of a vehicle and operatively connected to the vehicle brakes. However, it is more than just a brake light on the front of the vehicle.

The signal is made simple in construction, relatively small in size and is proposed for use inside of a vehicle. It is preferably mounted directly on the inside of a vehicle windshield and is located high and in a medial position. Ideally, it is placed behind the commonly known inside rear-view mirror supported from the windshield header bar. In such position it does not obstruct the driver's vision and is visible over a greater range for those outside.

The inside mounting enables less expensive manufacture and assembly and easier installation for an overall reduction in cost to assure greatest acceptance and use. The signal can be attached to the windshield of all cars on the road. The inside mounting assures protection from road dirt and inclement weather and in its high position is removed from other vehicle lights which might detract from its intended purpose. The signal provides two lights wired in parallel and a monitor visible by the driver to insure that the lights are working properly. The signal provides a louvered sun shade to insure good visibility on bright sunshine days.

DESCRIPTION OF THE DRAWINGS

In the drawings wherein, for purposes of clarity, certain details and elements may be omitted from one or more views:

FIG. 1 is a perspective view of the windshield area of a vehicle showing the interior mounting of the signal device embodying the invention;

FIG. 2 is a fragmentary side elevational view of the windshield area of FIG. 1 and showing the signal device embodying the invention held against the interior of the windshield;

FIG. 3 is an enlarged elevational front view of the signal device, of FIGS. 1 and 2, with portions thereof broken away;

FIG. 4 is a top plan view taken generally on the plane of line 4—4 of FIG. 3 and looking in the direction of the arrows;

FIGS. 5 and 6 are cross-sectional views taken generally on the planes of lines 5—5 and 6—6, respectively, of FIG. 3 and looking in the direction of the arrows;

FIG. 7 is an enlarged cross-sectional view of the lens assembly of the signal device taken generally on the plane of line 7—7 of FIG. 3 and looking in the direction of the arrows;

FIG. 8 is an enlarged view taken generally on the plane of line 8—8 of FIG. 5 so as to illustrate the interior of the signal device;

FIG. 9 is a view similar to FIG. 4 but having portions thereof broken away and in cross-section in order to better illustrate the interior details of the signal device;

FIG. 10 is a fragmentary cross-sectional view taken on the plane of line 10—10 of FIG. 5 and looking in the direction of the arrows; and FIG. 11 is a schematic representation of a vehicle employing the signal device in combination with other electrical safety signal devices.

DESCRIPTION OF THE PREFERRED EMBODIMENT

Referring now in greater detail to the drawings, a passenger car or other vehicle 10, shown in FIGS. 1 and 2, is shown provided with a driver communication signal device 12 mounted on the inside of the vehicular windshield 14 near the top thereof as to be in relatively close proximity to a top header bar 16 and in the general vicinity of the interior rear view mirror 18.

The rear view mirror assembly 18 may be of the type comprising a generally depending arm 20 which serves to support the mirror head 22 as from the header bar 16. As shown, the driver communication signal device 12 is engaged to the vehicular windshield 14 so as to be generally between the windshield 14 and support arm 20.

Referring, for example, to FIGS. 3, 4, 5 and 6 it can be seen that the signal device 12 is comprised of a rearwardly disposed housing 24 with a forward opening 26 generally closed by a lens assembly 28 which, in the preferred embodiment, is comprised of an outer or forwardly disposed clear lens 30, preferably provided with a back surface of pillow optics 32 which, as well known in the art, are effective for diffusing the light emanating from the signal device 12. The clear or forward lens is provided with a bordering rearwardly extending flange 34 which, as shown, is adapted to receive therein a louver plate 36 having a plurality of generally horizontally extending louvers 38 formed therein. The louvers 38 are provided for the purpose of affording protection against glare on bright sunshine days. Therefore, the signal device 12, when energized, can be seen even when the windshield of the car is tending to reflect the glare of sunshine into the eyes of pedestrians or other drivers who are to be benefited by seeing whether or not the signal device is energized.

An amber lens 40 is provided rearwardly of the louver plate 36 so as to be between the clear lens 30 and the light source, comprised of lamps or bulbs 42 and 44, within the chamber 45 of housing 24. Accordingly, whenever the bulbs 42 and 44 are energized, an amber colored signal light is produced.

Preferably, as typically illustrated in FIG. 7, the clear lens 30, louver plate 36 and amber lens 40 are secured to each other to form a unitized lens assembly 28 as by, for example, a plurality of rearwardly projecting studs 46 carried at the ends of the clear lens 30 (preferably one at each end) and respectively projecting through a first aperture 48 formed in the end of the louver plate 36 and an aligned second aperture 50 formed in the end of the amber lens 40. The extending end 52 of the studs 46 may be peened over against the rear surface of amber lens 40 in order to thereby hold the lens members and louver plate 36, sandwiched therebetween, in assembled relationship.

As shown in FIGS. 5, 6 and 10, the upper wall 54 of housing 24 is provided with a pair of spaced elongated slots formed therethrough one of which is typically shown at 56 in FIG. 5, 6 and 10 and the other of which is shown in hidden line at 58 of FIG. 8. Similarly, the lower wall 60 of housing 24 is provided with spaced elongated slots 62 and 64. As illustrated generally in FIGS. 5 and 10, the amber lens 40 is provided with a plurality of upwardly extending tabs, one of which is shown at 66, which are respectively received in upper slots 58 and 56 and a plurality of downwardly depending tabs, one of which is shown at 68, which are respectively received in lower slots 62 and 64 thereby locking the lens assembly 28 into assembled relationship with the housing 24 at the forward or open end thereof.

The device 12 is also preferably provided with a ring-like frame member 70 which, as will become apparent, may also serve as a mounting means for mounting the device 12 onto the windshield 14. The upper portion 72 of frame 70 is provided with a plurality of downwardly depending tabs, one of which is shown at 74, which are respectively received in upper slots 58 and 56 while the lower portion 76 of frame 70 is provided with a plurality of upwardly directed tabs, one of which is shown at 78, which are respectively received in lower slots 62 and 64. Accordingly, it can be seen that the slots 56, 58 and 62, 64 serve the dual function of receiving the holding tabs of both the frame 70 as well as the lens assembly 28.

As best seen in FIGS. 4 and 9, the rear wall of housing 24 is formed of two generally convex portions 80 and 82 which, in turn, define in the interior of chamber 45 two generally concave surfaces 84 and 86 which, in the preferred embodiment, serve as reflectors for bulbs 42 and 44.

As shown in FIGS. 3, 5, 6, 8 and 9, the interior of housing 24 is provided with bracket-like portions 88 and 90 which have opposed grooves 92 and 94 for cooperatively receiving therein an electrically non-conductive mounting plate 96 which, in turn, carries the bulb 42. As illustrated, in the preferred embodiment, both the bracket portions 88 and 90 as well as reinforcing gussetts 98 and 100 are formed integrally with the housing 24 as on and projecting inwardly from the rear wall thereof.

The interior of housing 24 is also provided with a second similar pair of bracket portions 102 and 104 which have opposed grooves 106 and 108 for cooperatively receiving therein a second electrically non-conductive mounting plate 110 which, in turn, carries the bulb 44. Also, in the preferred embodiment, both the bracket portions 102 and 104 as well as reinforcing gussetts 112 and 114 are formed integrally with the housing 24 as on and projecting inwardly from the rear wall thereof.

A plurality of spring-like electrical connectors 116, 118, 120 and 122 are provided in order to hold the terminals 124, 126, 128 and 130 of the bulbs and to complete an electrical circuit therethrough. As typically illustrated in FIG. 5, each of the spring-like electrical connectors is comprised of a bight portion 132, provided with a suitable terminal connector 134 for securing thereto a related electrical conductor, having opposed legs 136 and 138 passing through the insulating bulb mounting plate and terminating in free ends 140 and 142 formed to receive and contain therebetween the respective terminals of the bulbs. As best seen in FIG. 8, the bulbs 42 and 44 are arranged as to be in electrically parallel relationship. That is, a first conductor 144 has its opposite ends connected to connectors 116 and 120 while a second conductor 146 has its opposite ends electrically connected to bulb terminal connectors 118 and 122. A third conductor 148 has one end electrically connected to the spring contact member 120 while its other end is operatively electrically connected to one electrical side of a suitable related source of electrical potential. A fourth electrical conductor also having one end operatively electrically connected to an other electrical side of said suitable source of electrical potential, has its other end connected to the spring contact 118.

In view of the preceeding, it should be apparent that in the event one of the bulbs 42 or 44 should become burned-out the remaining bulb will continue to function. Further, even if one of the bulbs does become burned-out, because of the concavity of the surfaces 84 and 86 the reflection off of one of such surfaces behind the operative bulb will be sufficient to clearly illuminate the amber lens and provide a distinct warning to pedestrians and other vehicle operators.

Additional benefits are derived by virtue of having the bulbs 42 and 44 mounted on plates 96 and 110. That is, whenever either of such bulbs becomes burned-out, the replacement thereof is made easy by simply sliding out the related supporting plate and then extracting and replacing the burned-out bulb.

The preferred embodiment of the signal device 12 also includes means for indicating to the operator of the vehicle that the bulbs 42 and 44 are functioning as desired. For example, as shown in FIGS. 4, 8 and 9 suitable light monitoring means 152 are provided for indicating to the driver or vehicle operator that the lamps or bulbs of the signal device have been energized when the operator has applied the vehicular braking system. Such monitoring means 152 is illustrated as comprising, for example, a red plastic light-conveying cylinder 154 having an end 156 received within and supported by a bracket 158 carried within chamber 45. The opposite end 160 of light-transmitting cylinder 154, which as shown may be of reduced diameter, is inserted through an aperture 162 formed in the end of housing 24 so as to protrude and be visible to the vehicle operator. Accordingly, every time that the operator actuates the braking system and thereby energizes the bulbs 42 and 44 a small portion of the light created thereby will be transmitted through the cylinder 154 causing the protruding end 160 to appear to be illuminated. The vehicle operator thereby instantaneously knows whether or not the signal device 12 is operating properly.

The convex nature of the rear wall portions 80 and 82 enable the device 12 to be inserted and locked between the windshield and supporting arm 20 of the mirror assembly 18 merely by placing the signal device 12 in such a manner causing the support arm 20 to be nested between the convex portions 80 and 82 holding the device 12 against the windshield 14.

However, another method of securing the signal device 12 to the windshield 14 is illustrated by the ring 70 of the preferred embodiment.

That is, as shown by FIGS. 5 and 6, the ring 70 is provided with a continuous groove 180 formed thereabout in what may be considered the forward face thereof. A relatively resilient ring 182 may then be secured within the groove 180, as by, for example, employing a suitable cement between cooperating contacting surfaces thereof thereby leaving a portion of such resilient ring 182 protruding beyond the plane of the forward face of frame 70. The forward surface 184 of resilient ring 182 may be coated with a suitable adhesive enabling the entire device 12 to be mounted on the windshield 14 merely by pressing the adhesive-coated surface of the resilient ring 182 against the inner surface of the windshield 14. In such an arrangement, the heat of the bulbs 42 and 44 tends to keep the juxtaposed portion of the windshield clear of ice and snow. In this respect, it should be mentioned that in order to enhance the reflective qualities of the interior chamber 45, the walls defining the chamber are preferably coated with a highly reflective paint or other suitable coating.

FIG. 11 illustrates a schematic wiring diagram of circuitry within a vehicle embodying the signal means of the invention. In FIG. 11, a source of electrical potential 200 is grounded as at 202 and has its other terminal connected to conductor means 204, 206 and 208 respectively leading to a first manually actuated switch 210, a second manually actuated switch 212 usually referred to as a turn-indicator selector switch, and a third switch 214 actuated in response to actuation of the vehicular braking system as represented by the foot-operated pivoted brake pedal 216.

The vehicle 10 is conventionally provided at the forward end thereof with left and right head lamps 218, 220 and left and right turn-indicator lamps 222 and 224. Conductor means 226 electrically interconnects right turn-indicator lamp 224 to the turn-indicator selector switch 212 while conductor means 228 electrically interconnects switch 212 to turn-indicator lamp 222. The rear of the vehicle is conventionally provided with left and right rearwardly directed turn-indicator lamps 230 and 232 respectively electrically connected to conductor means 228 and 226. Additional rearwardly directed warning lamps 234 and 236 are usually provided which, as somewhat schematically depicted, may have double filaments 238, 240, 242 and 244 with filaments 242 and 244 being arranged in parallel and electrically connected to switch 210 via conductor means 246. Filaments 238 and 240 are also arranged in parallel and electrically connected to the source of electrical potential 200 as through conductor means 248 and switch 214. The signal device 12 may have its conductor 148 connected to ground while conductor 150 is connected to conductor means 248 leading to the switch 214.

In view of the above, it can be seen that in a vehicle 10, having circuitry as depicted in FIG. 11, whenever switch 210 is actuated to an "on" position headlamps 218 and 220 as well as filaments 242 and 244 of rear lamps 236 and 234 will be energized. Whenever the selector switch lever 213 is moved toward one operating position turn-indicator lamp 222 and rear turn-indicator lamp 230 will be energized in a timed flasher sequence as by the flasher control 232. Likewise when the selector lever 213 is moved to a second operating position forward turn-indicator lamp 224 and rear lamp 232 will be energized in a timed flasher sequence.

Further, when the brake system is energized switch 214 is actuated causing a circuit to be completed from source 200 to and through conductor 150, device 12 and conductor 148.

In view of the above, it should be apparent that the problems previously discussed, with reference to vehicles not embodying the invention, are overcome with the use of a signal device embodying the invention. For example, pedestrians are able to see, by virtue of the signal light at the top of the windshield being energized, that the vehicle is in the process of being stopped; operators undergoing panic stops can quickly ascertain via their own rear view mirror whether or not the vehicle behind them is aware of the situation and is applying its brakes; similarly, one traveling on the entrance ramp of a freeway system can, by a glance at the traffic already on the freeway, determine whether such traffic is applying its brakes to permit merging.

Although only one preferred embodiment of the invention has been disclosed and described it is apparent that other embodiments and modifications of the invention are possible within the scope of the appended claims.

I claim:

1. An automotive vehicle comprising a forwardly directed windshield, forwardly directed head lamp means, first rearwardly directed tail lamp means, a source of electrical potential, first switch means effective for completing an electrical circuit from said source to said head lamp means and said first tail lamp means, second forwardly directed warning lamps, second rearwardly directed tail lamp means, second switch means effective for selectively energizing said second warning lamps and said second tail lamp means in a manner whereby said second warning lamps and said second tail lamp means are cyclically energized in a flasher sequence, third rearwardly directed tail lamp means, a signal light device situated in the upper portion of a forwardly directed area of said vehicle at an elevation substantially above the height of said head lamp means and all of said tail lamp means, and directed forwardly thereof, and third switch means effective upon application of a braking system of said vehicle to cause energization of said signal light device so as to create a warning light visible forwardly of said vehicle and cause energization of said third rearwardly directed tail lamp means, said signal light device comprising a housing providing a relatively narrow and elongated chamber area space therewithin, signal light means mounted in said chamber area space, said signal light means comprising first and second bulbs respectively carried by first and second mounting plates, said mounting plates including portions for completing an electrical connection between said respective bulbs and related electrical circuitry, said first and second mounting plates being respectively carried by first and second bracket means carried within said chamber area, a transparent light diffusing lens mounted in the front of said housing, a louvered sun shade adjacent said lens, and a mounting ring surrounding said lens and in engagement with said housing, said ring being effective to operatively engage said forwardly directed upper portion of said vehicle and hold said housing secured thereto.

2. A driver communication signal comprising a housing providing a relatively narrow and elongated chamber area space therewithin, signal light means mounted in said chamber area space, said signal light means comprising first and second bulbs respectively carried by first and second mounting plates, said mounting plates including portions for completing an electrical connection between said respective bulbs and related electrical circuitry, said first and second mounting plates being respectively carried by first and second bracket means carried within said chamber area, a transparent light diffusing lens mounted in the front of said housing, a louvered sun shade adjacent said lens, and a mounting ring surrounding said lens and in engagement with said housing, said ring being formed to provide substantially close fitting engagement with the inside of a vehicle windshield centrally and near the top edge thereof.

3. A driver communication signal according to claim 2, including a second colored lens, said second lens being situated rearwardly of said light diffusing lens and between said louvered sun shade and said first and second bulbs.

4. A driver communication signal according to claim 2, including a second colored lens, said second lens being situated rearwardly of said light diffusing lens and between said louvered sun shade and said first and second bulbs, wherein said light diffusing lens includes a generally peripherally extending flange portion, wherein said louvered sun shade is received within the confines of said flange portion, and including fastener means operatively carried by said light diffusing lens and passing through openings formed in said louvered sun shade and said second lens for holding said light diffusing lens, said second lens and said sun shade in assembled relationship with respect to each other.

5. A driver communication signal according to claim 2, wherein said housing comprises a rearwardly disposed wall having concave first and second interior wall portions disposed generally rearwardly of said first and second bulbs, said concave wall portions being effective to serve as reflectors for reflecting the light from said first and second bulbs when energized forwardly through said light diffusing lens.

6. A driver communication signal according to claim 2, including light monitoring means effective for communicating a monitor signal to said driver whenever said first and second bulbs are energized and thereby illuminated.

7. A driver communication signal comprising a housing providing a relatively narrow and elongated chamber area space therewithin, signal light means mounted in said chamber area space, said signal light means comprising first and second bulbs respectively carried by first and second mounting plates, said mounting plates including portions for completing an electrical connection between said respective bulbs and related electrical circuitry, said first and second mounting plates being respectively carried by first and second bracket means carried within said chamber area, a transparent light diffusing lens mounted in the front of said housing, a louvered sun shade adjacent said lens, a second colored lens, said second lens being situated in said front of said housing so as to have said louvered sun shade situated between said second colored lens and said transparent light diffusing lens thereby defining a lens assembly, a plurality of receiving openings formed in said housing, and a plurality of retainer portions carried by said lens assembly, said plurality of openings being effective for receiving therein said plurality of retainer portions in order to hold said lens assembly in assembled relationship with said housing.

* * * * *